(12) United States Patent
Nakamura

(10) Patent No.: US 7,207,116 B2
(45) Date of Patent: Apr. 24, 2007

(54) AIR SAW

(75) Inventor: Akinori Nakamura, Habikino (JP)

(73) Assignee: Kuken Co., Ltd., Osaka (JP)

( * ) Notice: Subject to any disclaimer, the term of this patent is extended or adjusted under 35 U.S.C. 154(b) by 202 days.

(21) Appl. No.: 10/237,129

(22) Filed: Sep. 9, 2002

(65) Prior Publication Data
US 2003/0047053 A1    Mar. 13, 2003

(30) Foreign Application Priority Data
Sep. 10, 2001    (JP) ............... 2001-273497

(51) Int. Cl.
| | |
|---|---|
| B23D 49/10 | (2006.01) |
| B23D 49/16 | (2006.01) |
| B26D 5/04 | (2006.01) |
| B27B 19/04 | (2006.01) |
| B27B 19/09 | (2006.01) |

(52) U.S. Cl. ............ 30/392; 30/272.1; 30/277.4; 91/278; 91/325; 91/330

(58) Field of Classification Search ......... 30/166.3, 30/272.1, 277.4, 392–394; 83/639.1; 91/237, 91/247, 252, 277, 278, 325, 330
See application file for complete search history.

(56) References Cited

U.S. PATENT DOCUMENTS

| | | | | |
|---|---|---|---|---|
| 1,704,641 A | * | 3/1929 | Weed ...................... 30/392 |
| 2,751,940 A | * | 6/1956 | Miller ..................... 30/122 |
| 2,808,083 A | * | 10/1957 | Miller ..................... 30/392 |
| 3,155,011 A | * | 11/1964 | Hyskell ................ 30/392 X |
| 3,183,786 A | * | 5/1965 | Defoe, Jr. ............... 91/232 |
| 3,192,972 A | * | 7/1965 | Tenney ................ 30/392 X |
| 3,236,157 A | * | 2/1966 | Lovell et al. ............ 91/224 |
| 3,241,459 A | * | 3/1966 | Pirrello .................. 91/234 |
| 4,864,727 A | * | 9/1989 | Chu ..................... 30/272.1 |
| 5,615,746 A | * | 4/1997 | Chu ................. 30/272.1 X |
| 6,065,216 A | * | 5/2000 | Izumisawa ............... 30/392 |
| 6,415,876 B1 | * | 7/2002 | Bollinger et al. ....... 173/135 |

FOREIGN PATENT DOCUMENTS

| | | |
|---|---|---|
| JP | 7-314316 | 12/1995 |
| JP | 2000-254818 | 9/2000 |
| WO | WO 99/20424 | * 4/1999 |

* cited by examiner

*Primary Examiner*—Clark F. Dexter
(74) *Attorney, Agent, or Firm*—Wenderoth, Lind and Ponack, L.L.P.

(57) ABSTRACT

A main spindle of an air saw is reciprocated by sliding a piston in a cylinder chamber with the pressure of air supplied to the cylinder chamber via an air supply path so as to alternately apply the air pressure to pressure-receiving surfaces of a back plate and a front plate, wherein a rear air-cushion chamber is formed in a portion for fixing a return spring for urging the back plate toward the center of a cylinder while a front air-cushion chamber is formed in a portion for fixing a return spring for urging the front plate toward the center of the cylinder, so that the front and rear balance is maintained.

3 Claims, 10 Drawing Sheets

AIR SAW

BACKGROUND OF THE INVENTION

1. Field of the Invention

The present invention relates to an improvement in an air saw used for plate cutting work and deburring of metallic products as a kind of air tool.

2. Description of the Related Art

As shown in FIGS. 9 and 10, a general structure of an air saw 101 includes: a piston 113 slidably accommodated in a cylindrical cylinder chamber 112 arranged in a saw casing 102; a main spindle 129 passing through the piston 113 and having a back plate 130 arranged toward the rear end and a front plate 131 arranged toward the front end; and a blade-applied part 103 arranged at the front end of the main spindle 129 for attaching a saw blade 109 thereto.

Return springs 132 and 144 are respectively arranged in return-spring chambers 150 and 151, which are provided at the rear of the back plate 130 and the front of the front plate 131, respectively. Due to the return springs 132 and 144, the back plate 130 and the front plate 131 are urged toward the center of a cylinder 111, respectively. The front return-spring chamber 151 is open to the atmospheric air while the rear return-spring chamber 150 is formed to be an air-cushion chamber 149 communicating with an exhaust path 115 via a ventilation port 117. The exhaust path 115 is provided with two front and rear exhaust ports 152 and 153 controlled to open and close by the sliding of the piston 113.

Due to the pressure of air supplied from a charging path 104 via a charging port 114, the piston 113 in the cylinder chamber 112 is slid, so that the main spindle 129 reciprocates (moves back-and-forth) by alternately applying the pressure to pressure-receiving surfaces 130a and 131a of the back plate 130 and the front plate 131, so as to reciprocate the saw blade 109 attached to the blade-applied part 103.

However, in the conventional air saw 101 formed as described above, although the return-spring chamber 151 accommodating the return spring 144 urging the front plate 131 toward the center of the cylinder 111 is open to the atmospheric air, the rear return-spring chamber 150 accommodating the return spring 132 urging the back plate 130 toward the center of the cylinder 111 is formed to be the air-cushion chamber 149 communicating with the exhaust path 115 via the ventilation port 117, as described above. Therefore, the air in the cylinder chamber 112, for example, enters the air-cushion chamber 149 from the exhaust path 115 via the ventilation port 117 so as to increase the internal pressure of the air-cushion chamber 149.

Furthermore, the air entering the air-cushion chamber 149 through the clearance between the back plate 130 and the internal peripheral surface of the cylinder 111 also increases the internal pressure of the air-cushion chamber 149.

When the internal pressure of the air-cushion chamber 149 is increased in such a manner, the forces urging the main spindle 129 toward the center by the front and rear return springs 144 and 132 are off-balance because the internal pressure of the air-cushion chamber 149 is applied in addition to the elastic force of the return spring 132 from rear to the front relative to the elastic force of the return spring 144 from front to the rear.

As a result, as shown in FIG. 11, the back plate 130 extends beyond the normal advanced position to the front (to the left in the drawing), so that the pressure-receiving surface (front surface) 130a of the back plate 130 abuts the rear surface 113a of the retracting piston 113 so as to generate so-called chattering (which is a clink-clanking sound). The chattering is further liable to be generated when the supplied air pressure is increased.

Also, the chattering is generated when the saw blade is caught on an object to be cut, as shown in the phantom line in FIG. 11. That is, when the saw blade is caught on an object to be cut 154, in order to break this up, the air saw is instinctively pulled toward the operator (the right in the drawing, i.e., rear side). Thus, the back plate 130 extends beyond the normal advanced position of the reciprocating to the front, so that the pressure-receiving surface (front surface) 130a of the back plate 130 abuts the rear surface 113a of the retracting piston 113 so as to generate the chattering.

During the chattering that is the collision between the pressure-receiving surface 130a of the back plate 130 and the rear surface 113a of the retracting piston 113, since the front plate 131 integrated with the main spindle 129 advances further than normal, the return spring 144 is compressed further than a predetermined degree so as to reduce the strength of the spring because of dimensional changes. Thus, the force returning the main spindle 129 rearwardly (the right in the drawing) is reduced, so that the chattering is further more liable to be generated. There has also been a problem that part of the main spindle 129 attaching the back plate 130 is liable to break, reducing durability.

Moreover, the part fixing the saw blade 109 may be loosened or the saw blade 109 may come off because of the vibration due to the chattering, so that the work efficiency may be reduced. Furthermore, the chattering not only causes increased noise, but also increases the vibration, thereby deteriorating the work environment and the worker's health.

Additionally, when a member to be cut has a double structure with two plates, the rear plate may be cut even if it is not required to be cut. In order to avoid this, air supply is reduced, and even the stroke is reduced. However, the force driving the main spindle is extremely reduced because of reduced energy supply, which is not fit for practical use.

SUMMARY OF THE INVENTION

The present invention has been made in view of the above described problems, and it is an object thereof to provide an air saw capable of reducing noise, deterioration in work efficiency and work environment, and adverse effects on worker's health by preventing chattering.

In order to achieve the above-described object, an air saw according to the present invention comprises a casing, a cylinder chamber formed in the casing, a cylinder, a piston movably arranged in the cylinder chamber, a main spindle passing through the piston and having a back plate disposed toward the rear end and a front plate disposed toward the front end, and each of the back and front plates has a return spring. The air saw further comprises a saw blade, a blade-applied part arranged at the front end of the main spindle for attaching the saw blade thereto, and an air supply path, wherein the back plate and the front plate are urged toward the center of the cylinder by the respective return springs while the main spindle is reciprocated by sliding the piston in the cylinder chamber with the pressure of air supplied to the cylinder chamber via the air supply path so as to alternately apply the air pressure to pressure-receiving surfaces of the back plate and the front plate. A rear air-cushion chamber is formed in a portion for fixing the return spring for urging the back plate toward the center of the while a front air-cushion chamber is formed in a portion for fixing the return spring for cylinder, urging the front plate toward the center of the cylinder.

Preferably, the air saw further comprises at least one exhaust path with one end atmospherically opened, wherein the front air-cushion chamber communicates with the exhaust path via at least one exhaust port, and the exhaust port is formed to have a position at which the exhaust port is closed when the front plate advances beyond a normal advanced position. The air saw further comprises a flow-regulating valve arranged in the exhaust path, wherein the stroke of the saw blade can be adjusted by the flow regulation with the flow-regulating valve.

In the air saw according to the present invention, as described above, the rear air-cushion chamber is formed in a portion for fixing the return spring for urging the back plate toward the center of the cylinder while the front air-cushion chamber is formed in a portion for fixing the return spring for urging the front plate toward the center of the cylinder, so that the main spindle is located at a normal position by forces urging both ends thereof toward the center of the cylinder due to the elastic forces of the return springs and the air pressures of the air-cushion chambers.

During the operation of the air saw, when the saw blade is caught on an object to be worked and the operator pulls the air saw so as to break this up, if the main spindle further advances across the normal advanced position, the front air-cushion chamber is sealed. Thus, due to the air pressure in the sealed front air-cushion chamber and the elastic force of the front return-spring, the front plate is pushed rearward, so that the abnormal advancement of the main spindle is blocked, preventing the chattering.

Therefore, the breakdown of part of the main spindle due to the chattering is prevented, improving the durability while the part fixing the saw blade is prevented from loosening or allowing the saw blade to come off because of the vibration due to the chattering. Thus, the work efficiency can be greatly improved.

Moreover, the chattering can be prevented, so that a conventional large amount of noise and vibration can be reduced, improving the work environment and the worker's health.

In addition to these, ends of the front and rear air-cushion chambers communicate with the atmospherically opened exhaust path while a flow-regulating valve is provided in the exhaust path so as to adjust the stroke of the saw blade by the flow regulation with the flow-regulating valve. Therefore, only the external side of the member to be cut having a double structure can be cut, for example, further improving the work efficiency.

DESCRIPTION OF THE PREFERRED EMBODIMENTS

An air saw according to an embodiment of the present invention will be described below with reference to the drawings.

Figure 1:
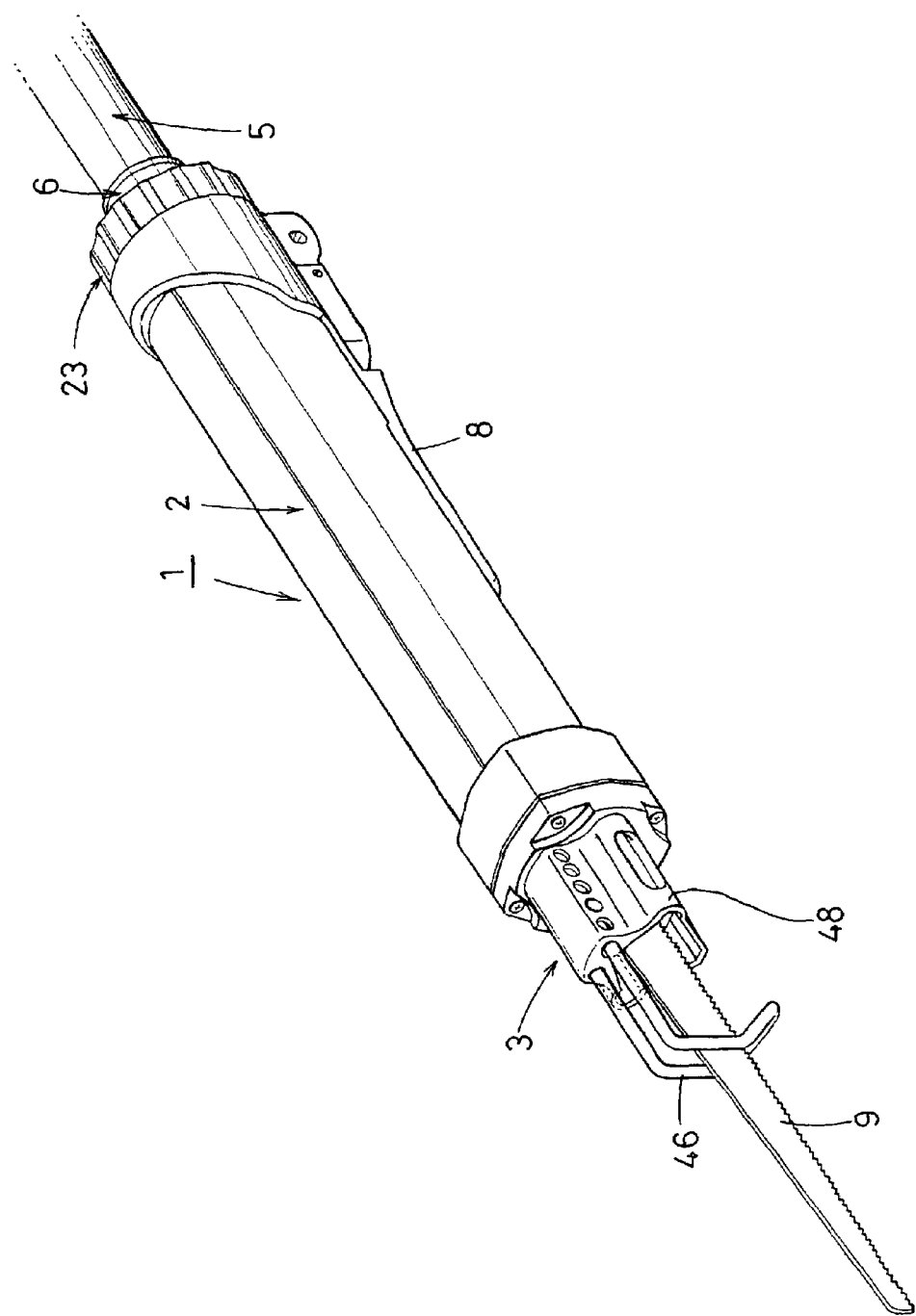
FIG. 1 is a perspective view of an air saw according to the present invention.

FIG. 1 is a perspective view of the air saw and the entire air saw is indicated by numeral 1. The air saw 1 comprises a substantially cylindrical casing 2, a blade-connection part 3 arranged in the front of the casing 2, and a hose-connection part 6 disposed at the rear end of the casing 2 to be connected to a hose 5 for supplying the air pressurized by a compressor (not shown) to an air-supply path 4. On the rear bottom surface of the casing 2, an operating lever 8 is provided for supplying the air supplied to the hose-connection part 6 to the air-supply path 4 by operating an on-off valve 7 interposed in the air-supply path 4 (see FIG. 2).

The casing 2 is provided with a blade driver 10 assembled therein for reciprocating a saw blade 9 attached to the blade-connection part 3 by operation of the operating lever 8 with the air supplied from the hose-connection part 6. The blade driver 10 is configured as follows.

Figure 2:
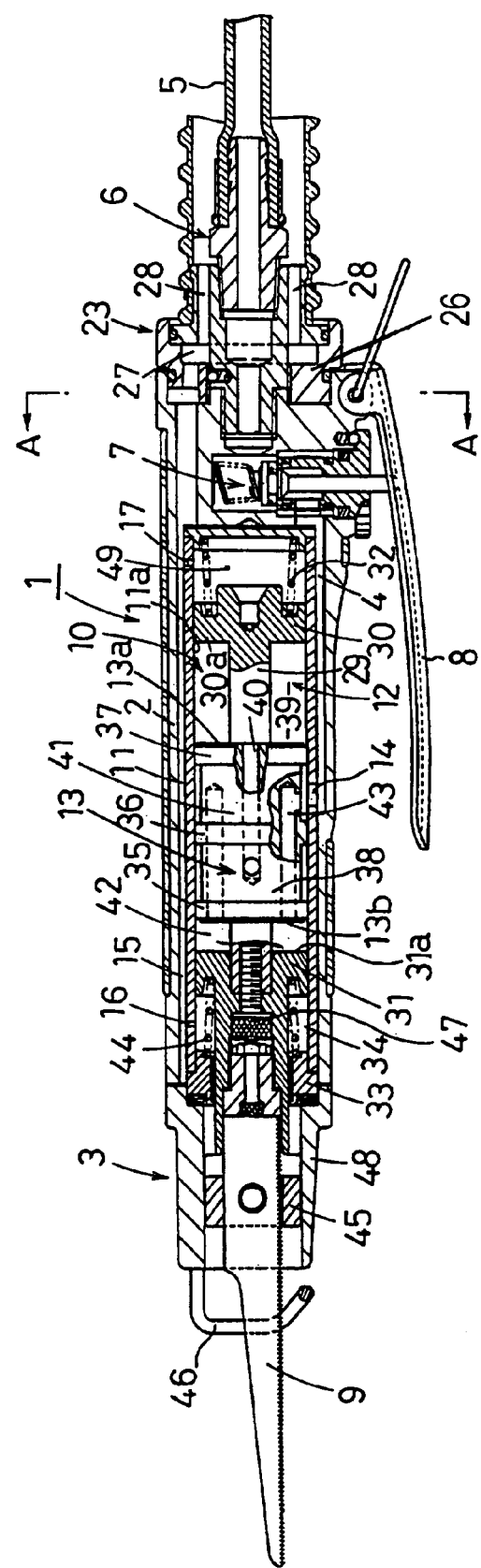
FIG. 2 is a longitudinal sectional side-view of the air saw according to the present invention.
Figure 3:
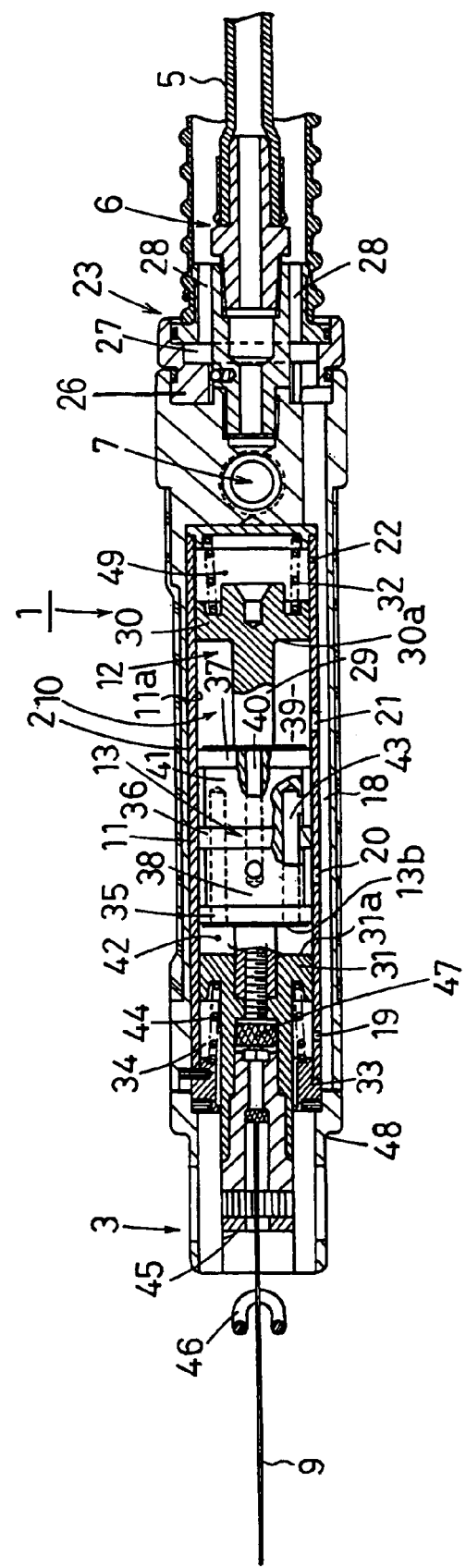
FIG. 3 is a longitudinal sectional plan-view of the air saw according to the present invention.

As shown in FIGS. 2 and 3, the casing 2 is provided with a cylinder 11 inner-packed therein, and a piston 13 is accommodated within the cylinder 11 so as to be able to move back and forth for defining the front and rear of a cylinder chamber 12. At the lower center of the cylinder 11, an air-supply port 14 is formed for communicating with the air-supply path 4.

In the vicinities of the upper front and rear ends of the cylinder 11, as shown FIG. 2, first-side exhaust ports 16 and 17 each communicate with a first exhaust path 15 formed between the casing 2 and the cylinder 11. On one side-wall of the cylinder 11, as shown in FIG. 3, second-side exhaust ports 19, 20, 21, and 22 are formed for communicating with a second exhaust path 18 formed between the casing 2 and the cylinder 11 in the same way as in the first exhaust path 15.

The diameters of the first-side exhaust ports 16 and 17 and the second-side exhaust ports 19 and 22 are small, and the diameters of the second-side exhaust ports 20 and 21 are comparatively larger.

Figure 4:
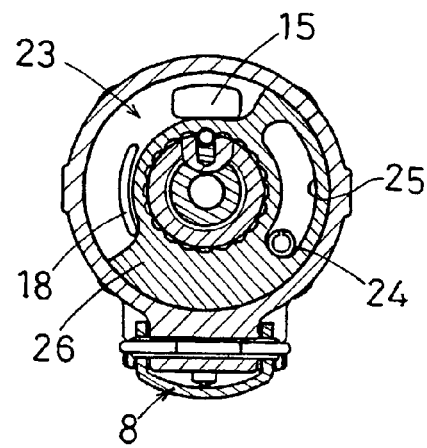
FIG. 4 is a cross-sectional view at the line A—A of FIG. 2 of the air saw according to the present invention.

As shown in FIG. 4, the cross-sectional area of the first exhaust path 15 is large while the cross-sectional area of the second exhaust path 18 is comparatively smaller. In the vicinity of the outlets of the first exhaust path 15 and the second exhaust path 18, a flow-regulating valve 23 is provided so as to atmospherically discharge the exhausted air from both exhaust paths 15 and 18.

Figure 5:
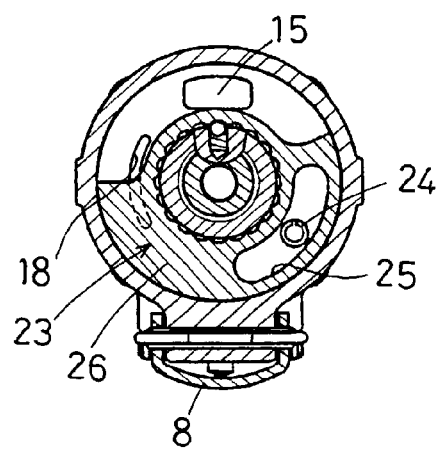
FIG. 5 is a schematic representation for illustrating an operation in the cross-sectional view at the line A—A of FIG. 2 of the air saw according to the present invention.
Figure 6:
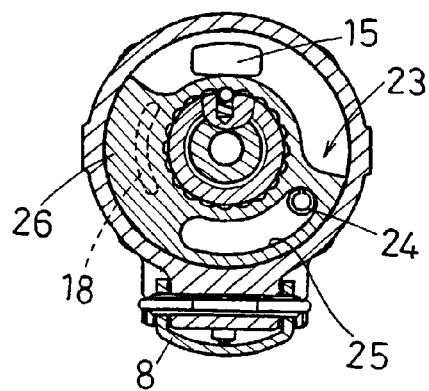
FIG. 6 is a schematic representation for illustrating an operation in the cross-sectional view at the line A—A of FIG. 2 of the air saw according to the present invention.

The flow-regulating valve 23, as shown in FIGS. 4 to 6, adjusts the opening area of the second exhaust path 18 while maintaining the opening area of the first exhaust path 15, and has a valve body 26 provided on the opening area of the second exhaust path 18. The rotational angle of the valve body 26 is limited by a knock-pin 24 and an elongated hole 25, into which the knock-pin 24 passes through.

In addition, according to the embodiment, as shown in FIGS. 4 to 6, the first exhaust path 15 and the second exhaust path 18 converge at the part of the valve body 26. Alternatively, they may of course converge in an exhaust-air chamber 27, which is disposed in the rear of the valve body 26 and will be described later, while the first exhaust path 15 and the second exhaust path 18 are independent from each other at the part of the valve body 26, as shown in FIGS. 12 to 14.

Figure 12:
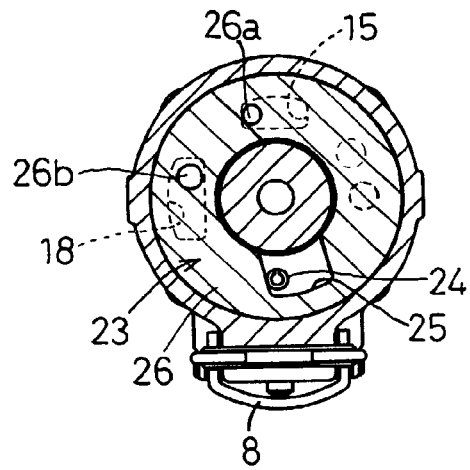
FIG. 12 is a drawing equivalent to FIG. 4, showing part of a modified flow-regulating valve of the air saw according to the present invention.
Figure 13:
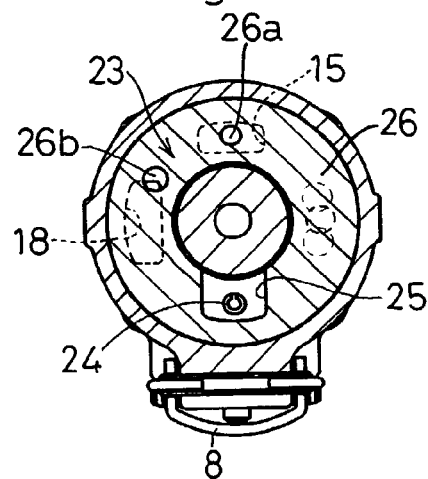
FIG. 13 is a drawing equivalent to FIG. 5, showing part of the modified flow-regulating valve of the air saw according to the present invention.
Figure 14:
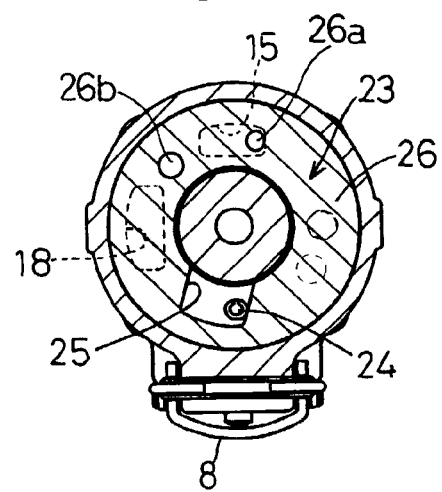
FIG. 14 is a drawing equivalent to FIG. 6, showing part of the modified flow-regulating valve of the air saw according to the present invention.

As for the cross-sectional areas of the first exhaust path 15 and the second exhaust path 18, as indicated by dotted lines in FIGS. 12 to 14, the first exhaust path 15 may be small while the second exhaust path 18 may be formed larger. While the opening area of a hole 26a for the first exhaust path 15 formed in the valve body 26 is maintained, the opening area of the second exhaust path 18 may also be adjusted with a hole 26b for the second exhaust path 18.

In the rear portion of the valve body 26, the exhaust-air chamber 27 is formed for releasing the pressure of the air discharged from the first exhaust path 15 and the second exhaust path 18, so that the exhaust note is reduced because the air is substantially uniformly discharged from a number of small holes 28 formed in the periphery of the hose-connection part 6.

The cylinder 11 is provided with a main spindle 29 boring through the piston 13. In the rear end (the right end in the drawing) portion of the main spindle 29, there is a back plate 30 with its periphery internally touching the internal peripheral surface 11a of the cylinder 11, while in the front end (the left end in the drawing) portion of the main spindle 29, there is provided a front plate 31 with its periphery internally touching the internal peripheral surface 11a of the cylinder 11.

It is preferable that the mass of the piston 13 and the mass of the main spindle 29 when the masses of the front plate 31 and the back plate 30 are added thereto be substantially the same.

In the rear of the back plate 30, a rear air-cushion chamber 49 is formed, in which a rear return-spring 32 is accommodated. The first-side exhaust port 17 communicating with the first exhaust path 15 and the second-side exhaust port 22 communicating with the second exhaust path 18 shown in FIG. 3 are formed in the part of the cylinder 11 within (surrounding) the rear air-cushion chamber 49.

On the other hand, to the front of the front plate 31 at the end of the cylinder 11, a sealing cap 33 is attached so as to form a front air-cushion chamber 34 at the front plate 31.

While a front return-spring 44 is accommodated in the front air-cushion chamber 34, the first-side exhaust port 16 communicating with the first exhaust path 15 and the second-side exhaust port 19 communicating with the second exhaust path 18 are formed in the part of the cylinder 11 within (surrounding) the front air-cushion chamber 34.

The first-side exhaust port 16 and second-side exhaust port 19 are located at positions at which the ports are closed with the front plate 31 when the front plate 31 extends beyond the normal advanced position.

The piston 13 moving in the cylinder 11 with the main spindle 29 passing therethrough is provided with annular lands 35, 36, and 37 formed in the central periphery, and the rear periphery for internally touching the internal peripheral surface 11a of the cylinder 11.

A space 38 between the front land 35 and central land 36 communicates with a retracting path 40 for supplying the air from the air-supply port 14 to a space 39 between the rear surface 13a of the piston 13 and the front surface (air-receiving surface) portion 30a of the back plate 30 so as to apply a force in the retracting direction of the main spindle 29 (the advancing direction of the piston 13).

A space 41 between the rear land 37 and central land 36 communicates with an advancing path 43 for supplying the air from the air-supply port 14 to a space 42 between the front surface 13b of the piston 13 and the rear surface (air-receiving surface) portion 31a of the front plate 31 so as to apply a force in the advancing direction of the main spindle 29 (the retracting direction of the piston 13).

In addition, a blade holder 45 disposed in the blade-connection part 3 is attached to the front end of the front plate 31 which is attached to the front end of the main spindle 29 with a bolt 47. A blade guide 46 is adjustably attached (i.e., adjustable in a forward and rear direction) to a blade cap 48 attached to the end of the casing 2.

The operation of the air saw 1 configured as above will be described below.

First, prior to starting the air saw 1, the rearwardly pressing force of the front plate 31 with the front return-spring 44 and the forwardly pressing force of the back plate 30 with the rear return-spring 32 are balanced, so that the main spindle 29 is located at a neutral position in the normal reciprocating stroke while the piston 13 is located at an arbitrary position, the position shown in FIG. 2, for example.

Next, from the state shown in FIG. 2, when the on-off valve 7 is opened by the operation of the operating lever 8, the air pressurized by a compressor from the hose 5 in the hose-connecting part 6 enters the space 41 between the rear land 37 and central land 36 via the air-supply port 14. Then, the air from the space 41 enters the space 42 between the front surface 13b of the piston 13 and the rear surface (air-receiving surface) portion 31a of the front plate 31 via the advancing path 43.

Figure 7:
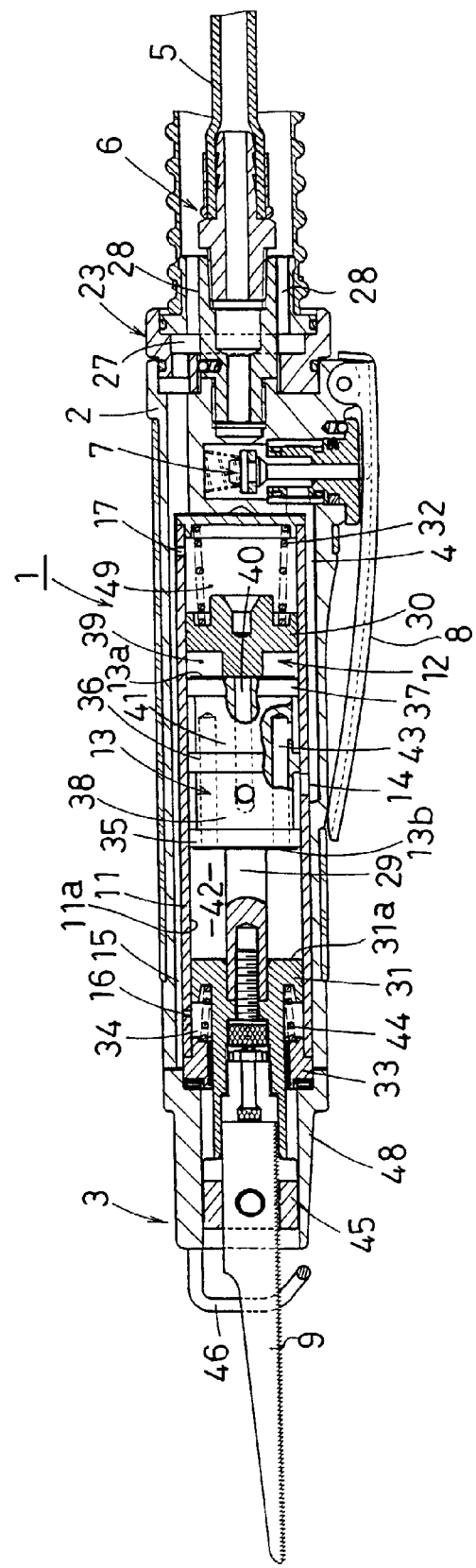
FIG. 7 is a longitudinal sectional side-view of the air saw according to the present invention.

When the air enters the space 42 in such a manner, the front plate 31 is moved forwardly (toward the left in the drawing) by the pressure of the air against the elastic force of the front return-spring 44 and the air-cushioning force so as to advance the saw blade 9 to the position shown in FIG. 7 while the piston 13 is moved rearwardly (toward the right in the drawing).

When the front plate 31 moves forwardly, the air in the front air-cushion chamber 34 flows into the first exhaust path 15 via the first-side exhaust port 16 while also flowing into the second exhaust path 18 via the second-side exhaust port 19. On the other hand, the air enters the rear air-cushion chamber 49 in the rear of the forwardly moving back plate 30 from the first-side exhaust port 17 communicating with the first exhaust path 15 and from the second-side exhaust port 22 communicating with the second exhaust path 18, so that the main spindle 29 is smoothly moved forwardly (toward the left in the drawing).

Simultaneously, when the piston 13 is moved rearwardly (toward the right in the drawing), together with the forward (left in the drawing) movement of the back plate 30, the space 39 between the rear surface 13a of the piston 13 and the front surface (air-receiving surface) portion 30a of the back plate 30 is pressurized, so that the air in the space 39 is discharged to the second exhaust path 18 via the second-side exhaust port 21.

Also, through the retracting path 40, the air in the space 38 between the front land 35 and central land 36 is discharged to the second exhaust path 18 via the second-side exhaust port 20.

Therefore, when the air amount discharging outside from the second exhaust path 18 is changed while running from the state shown in FIG. 4 down to the state shown in FIGS. 5 and 6, the rearward (right in the drawing) moving speed of the piston 13 can be adjusted, so that the stroke can be adjusted substantially without changing the driving force of the main spindle 29 by adjusting the back pressure applied to the front plate 31.

In addition, when the opening area of the second exhaust path 18 is entirely closed with the valve body 26 of the flow-regulating valve 23, as shown in FIG. 6, the air discharged to the second exhaust path 18 via the second-side exhaust port 20 or 21 enters the front air-cushion chamber 34 from the second-side exhaust port 19 to be discharged from the first-side exhaust port 16.

When the central land 36 advances rearward beyond the air-supply port 14 because of the further movement of the piston 13, the air pressurized by a compressor enters the space 38 between the front land 35 and central land 36 from the air-supply port 14 in contrast to the above description. From the space 38, the air enters the space 39 between the rear surface 13a of the piston 13 and the front surface (air-receiving surface) portion 30a of the back plate 30 via the retracting path 40.

When the air enters the space 39 in such a manner, the back plate 30 is moved rearwardly (toward the right in the drawing) by the pressure of the air against the elastic force of the rear return-spring 32 and the air-cushioning force so as to retract the saw blade 9 from the position shown in FIG. 7 while the piston 13 is moved forwardly (toward the left in the drawing).

When the back plate 30 moves rearwardly, the air in the rear air-cushion chamber 49 flows to the first exhaust path 15 via the first-side exhaust port 17 while also flowing to the second exhaust path 18 via the second-side exhaust port 22. The air enters the front air-cushion chamber 34 in the front of the rearwardly moving front plate 31 from the first-side exhaust port 16 communicating with the first exhaust path 15 and from the second-side exhaust port 19 communicating with the second exhaust path 18, so that the main spindle 29 is smoothly moved rearwardly (toward the right in the drawing).

On the other hand, when the piston 13 is moved forwardly (toward the left in the drawing), together with the rearward (right in the drawing) movement of the front plate 31, the space 42 between the front surface 13b of the piston 13 and the rear surface (air-receiving surface) portion 31a of the front plate 31 is pressurized, so that the air in the space 42 is discharged to the second exhaust path 18 via the second-side exhaust port 20.

Also, through the advancing path 43, the air in the space 41 between the rear land 37 and central land 36 is discharged to the second exhaust path 18 via the second-side exhaust port 21.

Therefore, also during the rearward (right in the drawing) movement of the main spindle 29, when the air amount discharging outside from the second exhaust path 18 is changed while running from the state shown in FIG. 4 down to the state shown in FIGS. 5 and 6, the forward (left in the drawing) moving speed of the piston 13 can be adjusted. Therefore, the stroke can be adjusted substantially without changing the driving force of the main spindle 29 by adjusting the back pressure applied to the back plate 30.

Thus, the stroke of the main spindle 29 can be adjusted corresponding to an object to be worked.

Figure 8:
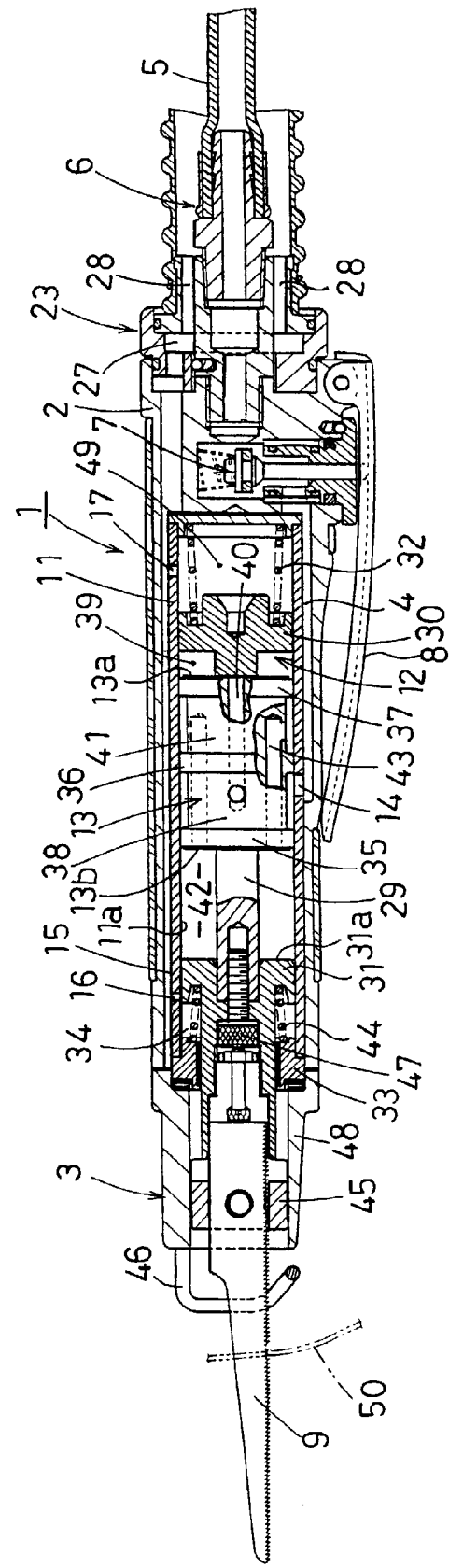
FIG. 8 is a longitudinal sectional side-view of the air saw according to the present invention.
Figure 9:
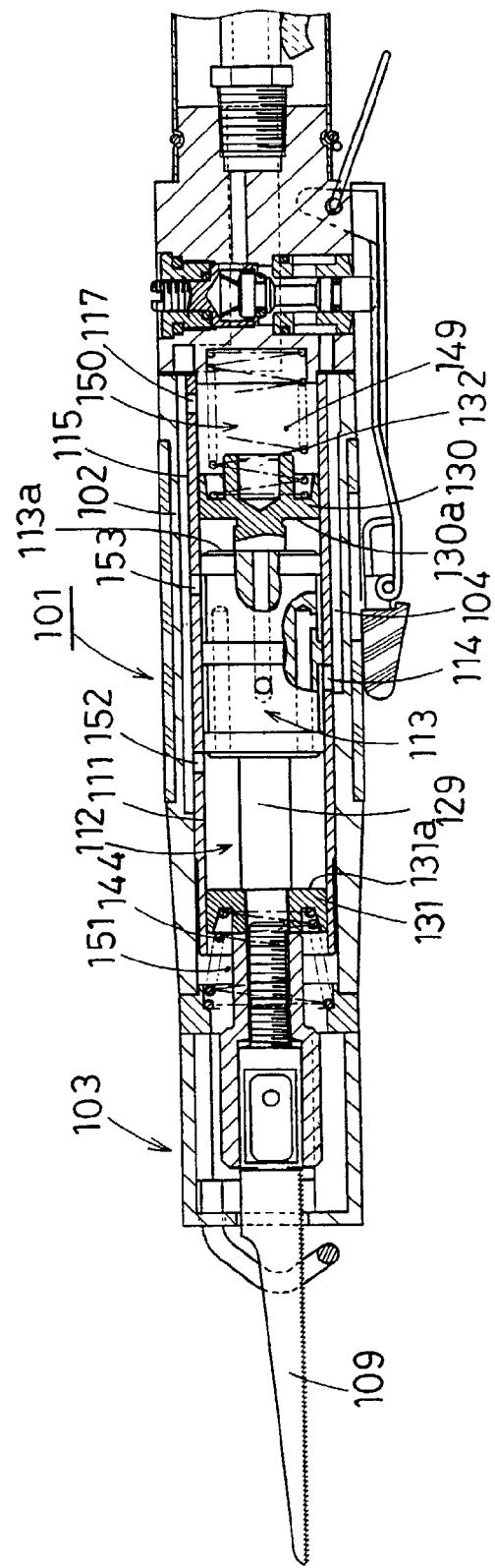
FIG. 9 is a longitudinal sectional side-view of a conventional air saw.
Figure 10:
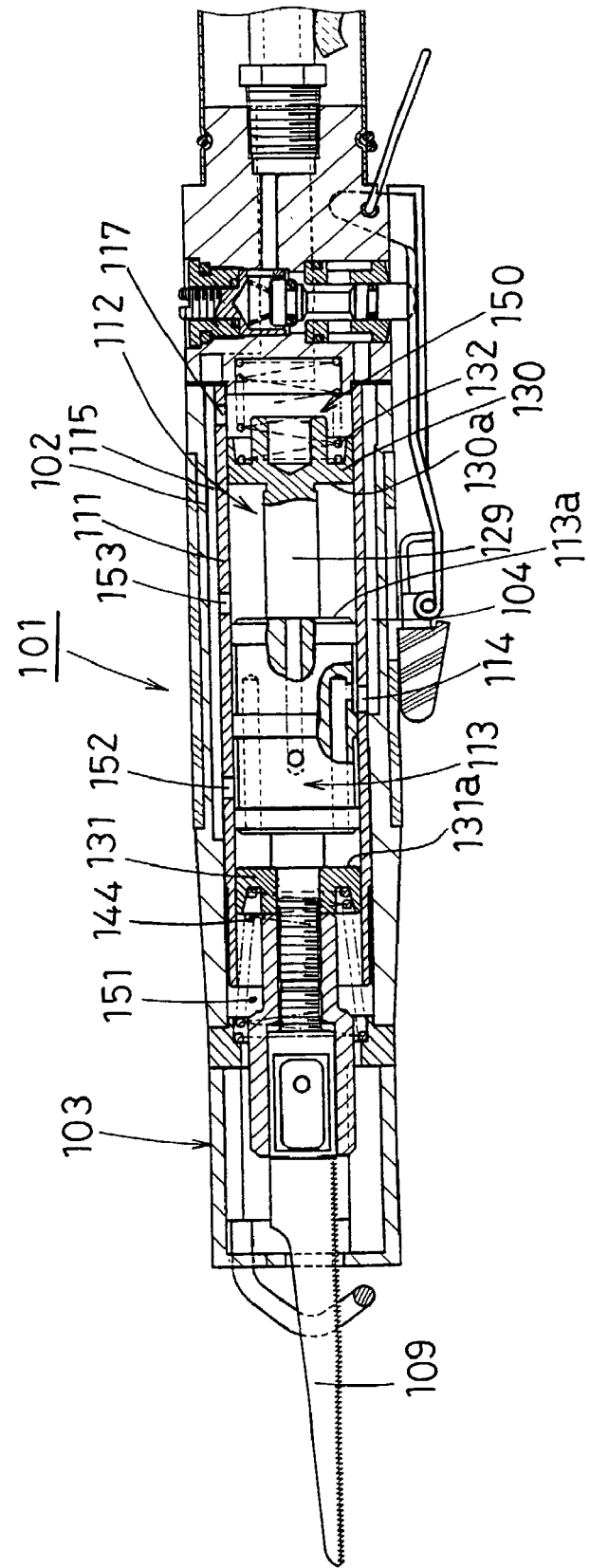
FIG. 10 is a longitudinal sectional side-view of the conventional air saw.
Figure 11:
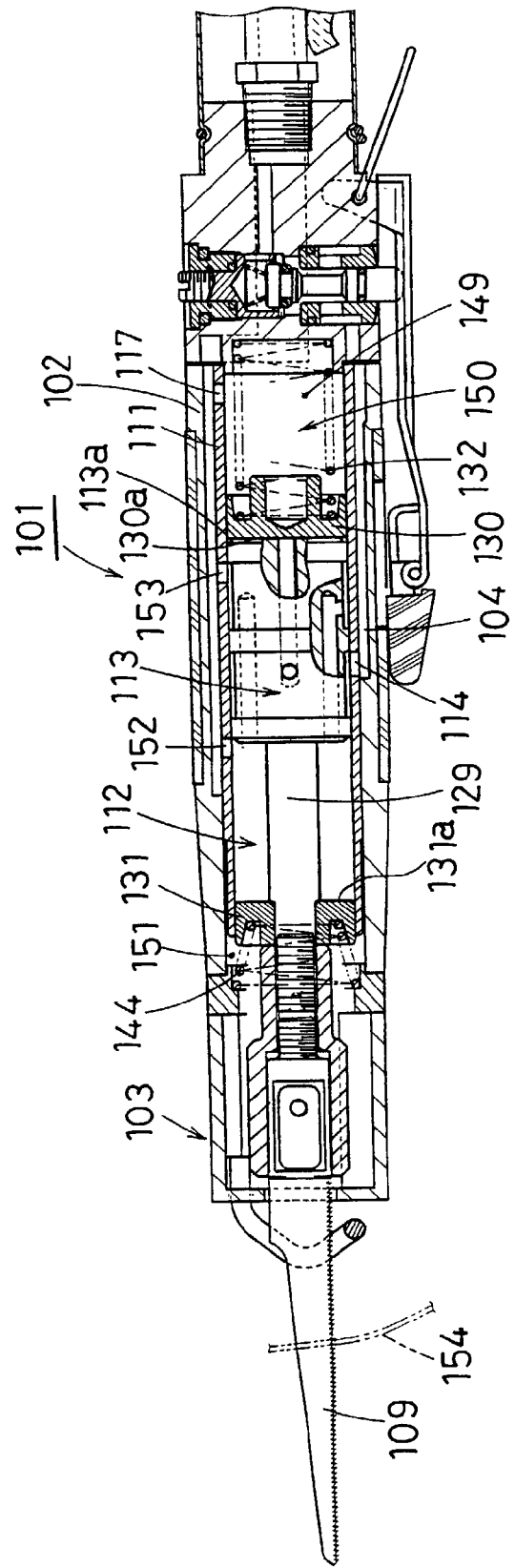
FIG. 11 is a longitudinal sectional side-view of the conventional air saw.

By repeating such back-and-forth movement of the main spindle 29 so as to reciprocate the saw blade 9, an object to be worked is cut. However, as shown in FIG. 8, the saw blade 9 may be caught on an object to be worked 50. When the saw blade 9 is caught on an object to be cut 50, the operator pulls the air saw 1 automatically so as to break this up. In such a manner, when the air saw 1 is pulled toward the operator (the right in the drawing), the main spindle 29 further extends beyond the normal advanced position.

When the main spindle 29 advances beyond the normal advanced position, the front plate 31 closes the first-side exhaust port 16 communicating with the first exhaust path 15 and the second-side exhaust port 19 communicating with the second exhaust path 18, so as to seal up the front air-cushion chamber 34.

Therefore, the front plate 31 is pushed rearward by the air pressure in the sealed front air-cushion chamber 34 and an elastic force of the front return-spring 44, so as to prevent the main spindle 29 from moving further forward. Thus, a conventional chattering due to excessive forward movement of the main spindle 29 can be prevented.

In addition, according to the embodiment, the flow-regulating valve 23 is configured to have the valve body 26 provided on the opening area of the second exhaust path 18. The rotational angle of the valve body 26 is limited by the knock-pin 24 and the elongated hole 25, into which the knock-pin 24 passes through, so as to adjust the opening area of the second exhaust path 18 while maintaining the opening area of the first exhaust path 15. However, not being limited to this arrangement, the flow-regulating valve 23 may also be configured as other type valves such as a choke valve.

According to the embodiment, the saw blade is provided. Alternatively, a file blade and so forth may of course be attached instead of the saw blade.

What is claimed is:
1. An air saw comprising:
a casing;
a cylinder in said casing and having a cylinder chamber;
a piston movably arranged in said cylinder chamber;
a main spindle passing through said piston, said main spindle having a back plate at a rear end of said main spindle and having a front plate at a front end of said main spindle;
a front return spring for urging said front plate toward a center of said cylinder;
a back return spring for urging said back plate toward said center of said cylinder;
a saw blade connected to said front end of said main spindle;
an air supply path for supplying air into said cylinder chamber so as to slide said piston within said cylinder chamber to thereby alternately apply the supplied air against pressure-receiving surfaces of said front plate and said back plate so as to reciprocate said main spindle, wherein said cylinder further has a rear air-cushion chamber communicating with said air supply path, said back return spring being arranged in said rear air-cushion chamber, and said cylinder further having a front air-cushion chamber communicating with said air supply path, said front return spring being arranged in said front air-cushion chamber;
an exhaust path having an end open to atmosphere, and communicating with said front air-cushion chamber; and a flow-regulating valve arranged in said exhaust path, said flow-regulating valve being operable to regulate a flow of air through said exhaust path so as to adjust a stroke of said saw blade.

2. The air saw of claim 1, wherein said front air-cushion chamber communicates with said exhaust path via an exhaust port located such that said exhaust port is closed when said front plate advances toward a front end of said cylinder beyond a predetermined position.

3. The air saw of claim 1, wherein said main spindle is connected to a blade holder at said front end thereof, said saw blade being attached to said blade holder.

* * * * *